(12) United States Patent
He et al.

(10) Patent No.: US 11,978,910 B2
(45) Date of Patent: May 7, 2024

(54) ELECTRODE ASSEMBLY, BATTERY CELL, BATTERY, AND ELECTRICAL DEVICE

(71) Applicant: CONTEMPORARY AMPEREX TECHNOLOGY CO., LIMITED, Ningde (CN)

(72) Inventors: Changsheng He, Ningde (CN); Mingjian Liu, Ningde (CN); Keqiang Li, Ningde (CN); Xiaosong Liu, Ningde (CN); Bin Xie, Ningde (CN); Zhiyang Wu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/472,211

(22) Filed: Sep. 21, 2023

(65) Prior Publication Data
US 2024/0021839 A1    Jan. 18, 2024

Related U.S. Application Data

(63) Continuation of application No. PCT/CN2022/070163, filed on Jan. 4, 2022.

(51) Int. Cl.
*H01M 4/66* (2006.01)
*H01M 4/02* (2006.01)
*H01M 10/04* (2006.01)

(52) U.S. Cl.
CPC ....... *H01M 4/667* (2013.01); *H01M 10/0409* (2013.01); *H01M 10/0431* (2013.01); *H01M 2004/021* (2013.01); *H01M 2220/20* (2013.01)

(58) Field of Classification Search
None
See application file for complete search history.

(56) References Cited

U.S. PATENT DOCUMENTS

| 2014/0225313 | A1* | 8/2014 | Cooney | H01M 8/0202 |
| | | | | 264/400 |
| 2017/0279108 | A1* | 9/2017 | Herle | H01M 4/667 |
| 2021/0098809 | A1* | 4/2021 | Brett | H01M 8/0228 |

FOREIGN PATENT DOCUMENTS

| CN | 109873163 A | 6/2019 |
| CN | 212907804 U | 4/2021 |

(Continued)

OTHER PUBLICATIONS

International Search Report received in the corresponding International Application PCT/CN2022/070163, dated Aug. 23, 2022.

(Continued)

*Primary Examiner* — Scott J. Chmielecki
(74) *Attorney, Agent, or Firm* — Kilpatrick Townsend & Stockton LLP (57) ABSTRACT

Provided are an electrode assembly, a battery cell, a battery, and an electrical device. The electrode assembly includes first electrode plates and a second electrode plate that are of opposite polarities. The second electrode plate and two first electrode plates are stacked and wound to form the electrode assembly. The second electrode plate is located between the two first electrode plates. Each of the first electrode plates includes a first composite current collector and a first active material layer. The first active material layer is disposed on a surface that is of the first composite current collector and that is oriented back from the second electrode plate. The first composite current collector is configured to dielectrically isolate the first active material layer from the second electrode plate and allow passage of ions transmitted between the first active material layer and the second electrode plate.

19 Claims, 5 Drawing Sheets

(56) References Cited

FOREIGN PATENT DOCUMENTS

| | | |
|---|---|---|
| CN | 112909265 A | 6/2021 |
| JP | 2017168217 A | 9/2017 |

OTHER PUBLICATIONS

Written Opinion received in the corresponding International Application PCT/CN2022/070163, dated Aug. 23, 2022.

* cited by examiner

ELECTRODE ASSEMBLY, BATTERY CELL, BATTERY, AND ELECTRICAL DEVICE

CROSS-REFERENCE TO RELATED APPLICATIONS

The present application is a continuation of International Application No. PCT/CN2022/070163, filed on Jan. 4, 2022, named "ELECTRODE ASSEMBLY, BATTERY CELL, BATTERY, AND ELECTRICAL DEVICE", the entire content of which is incorporated herein by reference.

TECHNICAL FIELD

This application relates to the technical field of batteries, and in particular, to an electrode assembly, a battery cell, a battery, and an electrical device.

BACKGROUND

With the development of new energy technology, batteries are widely applied in more fields such as mobile phones, notebook computers, electric power carts, electric vehicles, electric airplanes, electric ships, electric toy cars, electric toy ships, electric toy airplanes, and electric tools.

As an energy storage element, a battery cell generally outputs electrical energy through a chemical reaction between an electrode assembly and an electrolytic solution. In battery technology, both performance and safety of the battery cell need to be considered. Therefore, how to enhance the safety of the battery cell is an urgent problem in the battery technology.

SUMMARY

Some embodiments of this application provide an electrode assembly, a battery cell, a battery, and an electrical device to improve safety of the battery cell effectively.

According to a first aspect, an embodiment of this application provides an electrode assembly, including first electrode plates and a second electrode plate that are of opposite polarities. The second electrode plate and the two first electrode plates are stacked and wound to form the electrode assembly. The second electrode plate is located between the two first electrode plates. Each of the first electrode plates includes a first composite current collector and a first active material layer. The first active material layer is disposed on a surface that is of the first composite current collector and that is oriented back from the second electrode plate. The first composite current collector is configured to dielectrically isolate the first active material layer from the second electrode plate and allow passage of ions transmitted between the first active material layer and the second electrode plate.

In the foregoing technical solution, the second electrode plate is located between the two first electrode plates, and the first electrode plate adopts a structure that includes a first composite current collector and a first active material layer. The first active material layer is disposed on a surface that is of the first composite current collector and that is oriented back from the second electrode plate. The first composite current collector serves a function of dielectrically isolating the first active material layer from the second electrode plate. The first composite current collector also serves functions of collecting current and allowing passage of ions transmitted between the first active material layer and the second electrode plate, and ensures normal transmission of ions between the first electrode plate and the second electrode plate. The electrode assembly of this structure cancels a separator between the first electrode plate and the second electrode plate, avoids a risk of contact and short circuit between the first electrode plate and the second electrode plate caused by shrinkage and deformation of the separator, and can effectively simplify the manufacturing process of the electrode assembly and reduce production costs.

In some embodiments, the first composite current collector includes a first insulative layer and a first conductive layer that are stacked. The first insulative layer is located between the first conductive layer and the second electrode plate. The first insulative layer is configured to dielectrically isolate the first conductive layer from the second electrode plate. The first active material layer is disposed on a surface that is of the first conductive layer and that is oriented back from the first insulative layer.

In the foregoing technical solution, the first insulative layer and the first conductive layer are stacked. The first conductive layer can reinforce the first insulative layer so that the first insulative layer is not prone to be deformed by shrinkage. The first insulative layer serves a function of dielectrically isolating the first conductive layer from the second electrode plate, and the first conductive layer serves a function of collecting current. That is, the first composite current collector compounded of the first insulative layer and the first conductive layer serves functions of a separator and a current collector.

In some embodiments, an air permeability of the first insulative layer is 50 to 3000 s/100 cc. In this way, it is ensured that the ions transmitted between the first active material layer and the second electrode plate can pass through the first insulative layer smoothly, and that the first insulative layer can block large particles.

In some embodiments, a porosity of the first conductive layer is 10% to 95%. The porosity in this range satisfies the requirement of a relatively high ion conductivity, so that a pass rate of the ions is relatively high.

In some embodiments, a thickness of the first conductive layer is 200 to 3000 nm. When the thickness falls within this range, the first conductive layer is of relatively high conductivity and high strength.

In some embodiments, the first conductive layer includes a first transition layer, a first thickening layer, and a first functional layer that are stacked in sequence. The first transition layer is located between the first insulative layer and the first thickening layer. The first active material layer is disposed on a surface that is of the first functional layer and that is oriented back from the first thickening layer.

In the foregoing technical solution, the first transition layer is located between the first insulative layer and the first thickening layer. The first transition layer serves a function of connecting the first insulative layer and the first thickening layer to implement the compounding of the first conductive layer and the first insulative layer. The first thickening layer disposed in the first conductive layer increases the thickness of the first conductive layer and the strength of the first conductive layer.

In some embodiments, the second electrode plate includes a current collector and a second active material layer. The second active material layer is disposed on two opposite surfaces of the current collector. The first composite current collector is located between the first active material layer and the second active material layer. The first composite current collector is configured to dielectrically isolate the first active material layer from the second active material layer and allow passage of ions transmitted between the first active material layer and the second active material layer.

In the foregoing technical solution, both sides of the current collector in the second electrode plate are coated with a second active material layer. Therefore, ions can be shuttled between each of the two first active material layers in the two first electrode plates and the corresponding one of the two second active material layers of the second electrode plate, thereby increasing the energy density effectively.

In some embodiments, the current collector in the second electrode plate is a second composite current collector that allows passage of ions.

In the foregoing technical solution, the current collector in the second electrode plate is a second composite current collector, thereby improving the ionic conductivity and the effect of the electrolytic solution in infiltrating the second electrode plate.

In some embodiments, the second composite current collector includes a second insulative layer and a second conductive layer that are stacked. The second conductive layer is disposed on two opposite surfaces of the second insulative layer. The second active material layer is disposed on a surface that is of the second conductive layer and that is oriented back from the second insulative layer.

In the foregoing technical solution, both of the two opposite surfaces of the second insulative layer are coated with the second conductive layer. The second conductive layer can reinforce the second insulative layer so that the second insulative layer is not prone to be deformed by shrinkage. The second composite current collector compounded of the second insulative layer and the two second conductive layers serves functions of a separator and a current collector.

In some embodiments, an air permeability of the second insulative layer is 50 to 3000 s/100 cc. In this way, it is ensured that the ions can pass through the second insulative layer smoothly, thereby improving the effect of the electrolytic solution in infiltrating the second electrode plate.

In some embodiments, a porosity of the second conductive layer is 10% to 95%. In this way, it is ensured that the electrolytic solution can pass through the second conductive layer quickly, thereby improving the effect of the electrolytic solution in infiltrating the second electrode plate.

In some embodiments, a thickness of the second conductive layer is 200 to 3000 nm. When the thickness falls within this range, the second conductive layer is of relatively high conductivity and high strength.

In some embodiments, the second conductive layer includes a second transition layer, a second thickening layer, and a second functional layer that are stacked in sequence. The second transition layer is located between the second insulative layer and the second thickening layer. The second active material layer is disposed on a surface that is of the second functional layer and that is oriented back from the second thickening layer.

In the foregoing technical solution, the second transition layer is located between the second insulative layer and the second thickening layer. The second transition layer serves a function of connecting the second insulative layer and the second thickening layer to implement the compounding of the second conductive layer and the second insulative layer. The second thickening layer disposed in the second conductive layer increases the thickness of the second conductive layer and the strength of the second conductive layer.

In some embodiments, the first electrode plates are positive electrode plates, and the second electrode plate is a negative electrode plate. A width of the second active material layer is greater than a width of the first active material layer.

In the foregoing technical solution, the width of the second active material layer of the negative electrode plate is greater than the width of the first active material layer of the positive electrode plate, thereby reducing occurrences of lithium plating.

According to a second aspect, an embodiment of this application provides a battery cell. The battery cell includes the electrode assembly according to any embodiment of the first aspect, and a housing configured to accommodate the electrode assembly.

According to a third aspect, an embodiment of this application provides a battery. The battery includes the battery cell according to any embodiment of the second aspect, and a box configured to accommodate the battery cell.

According to a fourth aspect, an embodiment of this application provides an electrical device. The electrical device includes the battery according to any embodiment of the third aspect.

According to a fifth aspect, an embodiment of this application provides a method for manufacturing an electrode assembly. The manufacturing method includes: providing first electrode plates and a second electrode plate; and stacking the second electrode plate and the two first electrode plates and then winding the electrode plates to form the electrode assembly, where the first electrode plates are of a polarity opposite to the second electrode plate. The second electrode plate is located between the two first electrode plates. Each of the first electrode plates includes a first composite current collector and a first active material layer. The first active material layer is disposed on a surface that is of the first composite current collector and that is oriented back from the second electrode plate. The first composite current collector is configured to dielectrically isolate the first active material layer from the second electrode plate and allow passage of ions transmitted between the first active material layer and the second electrode plate.

According to a sixth aspect, an embodiment of this application provides a device for manufacturing an electrode assembly. The manufacturing device includes: a providing apparatus, configured to provide first electrode plates and a second electrode plate; and an assembling apparatus, configured to stack the second electrode plate and two first electrode plates and then wind the electrode plates to form the electrode assembly, where the first electrode plates are of a polarity opposite to the second electrode plate. The second electrode plate is located between the two first electrode plates. Each of the first electrode plates includes a first composite current collector and a first active material layer. The first active material layer is disposed on a surface that is of the first composite current collector and that is oriented back from the second electrode plate. The first composite current collector is configured to dielectrically isolate the first active material layer from the second electrode plate and allow passage of ions transmitted between the first active material layer and the second electrode plate.

BRIEF DESCRIPTION OF DRAWINGS

To describe technical solutions in embodiments of this application more clearly, the following outlines the drawings to be used in the embodiments. Understandably, the following drawings show merely some embodiments of this application, and therefore, are not intended to limit the scope. A person of ordinary skill in the art may derive other related drawings from the drawings without making any creative efforts.

REFERENCE NUMERALS 1 housing;
2 electrode assembly; 21 tab; 22 first electrode plate; 221 first composite current collector; 2211 first insulative layer; 2212 first conductive layer; 2212a first transition layer; 2212b first thickening layer; 2212c first functional layer; 222 first active material layer; 23 second electrode plate; 231 second composite current collector; 2311 second insulative layer; 2312 second conductive layer; 2312a second transition layer; 2312b second thickening layer; 2312c second functional layer; 232 second active material layer;

3 end cap;
4 electrode terminal;
5 current collecting member;
6 pressure relief mechanism;
10 battery cell;
20 box;   201 first part;   202 second part;
100 battery;   200 controller;   300 motor;
1000 vehicle;   2000 manufacturing device; 2100 providing apparatus;
2200 assembling apparatus.

Unless otherwise defined, all technical and scientific terms used herein have the same meanings as what is normally understood by a person skilled in the technical field of this application. The terms used in the specification of this application are merely intended to describe specific embodiments but not intended to limit this application. The terms "include" and "contain" and any variations thereof used in the specification, claims, and brief description of drawings of this application are intended as non-exclusive inclusion. The terms such as "first" and "second" used in the specification, claims, and brief description of drawings herein are intended to distinguish between different items, but are not intended to describe a specific sequence or order of precedence.

Reference to "embodiment" in this application means that a specific feature, structure or characteristic described with reference to the embodiment may be included in at least one embodiment of this application. Reference to this term in different places in the specification does not necessarily represent the same embodiment, nor does it represent an independent or alternative embodiment in a mutually exclusive relationship with other embodiments.

In the description of this application, unless otherwise expressly specified and defined, the terms "mount", "concatenate", "connect", and "attach" are understood in a broad sense. For example, a "connection" may be a fixed connection, a detachable connection, or an integrated connection; or may be a direct connection or an indirect connection implemented through an intermediary; or may be internal communication between two components. A person of ordinary skill in the art is able to understand the specific meanings of the terms in this application according to specific situations.

In embodiments of this application, the same reference numeral denotes the same component. For brevity, detailed descriptions of the same component are omitted in a different embodiment. Understandably, dimensions such as thickness, length, and width of various components in the embodiments of this application shown in the drawings, and dimensions such as overall thickness, length, and width of an integrated device are merely illustrative descriptions, but do not constitute any limitation on this application.

"A plurality of" referred to in this application means two or more (including two).

In this application, a battery cell may include a lithium-ion secondary battery, a lithium-ion primary battery, a lithium-sulfur battery, a sodium-lithium-ion battery, a sodium-ion battery, a magnesium-ion battery, or the like, without being limited in embodiments of this application. The battery cell may be in various shapes such as a cylinder, flat body, or cuboid, without being limited in embodiments of this application. Depending on the form of packaging, the battery cell is typically classed into three types: cylindrical

DETAILED DESCRIPTION OF EMBODIMENTS

To make the objectives, technical solutions, and advantages of the embodiments of this application clearer, the following gives a clear description of the technical solutions in some embodiments of this application with reference to the drawings in some embodiments of this application. Evidently, the described embodiments are merely a part rather than all of the embodiments of this application. All other embodiments derived by a person of ordinary skill in the art based on the embodiments of this application without making any creative efforts still fall within the protection scope of this application.

battery cell, prismatic battery cell, and pouch-type battery cell. The embodiments of this application do not limit the type of the battery cell.

The battery mentioned in embodiments of this application means a stand-alone physical module that includes one or more battery cells to provide a higher voltage and a higher capacity. For example, the battery mentioned in this application may include a battery module, a battery pack, or the like. A battery typically includes a box configured to package one or more battery cells. The box prevents liquid or other foreign matters from affecting the charging or discharging of the battery cells.

A battery cell includes an electrode assembly and an electrolytic solution. The electrode assembly includes a positive electrode plate and a negative electrode plate. The battery cell works primarily by relying on shuttling of metal ions between the positive electrode plate and the negative electrode plate. The positive electrode plate includes a positive current collector and a positive active material layer. A surface of the positive current collector is coated with the positive active material layer. Of the positive current collector, a part uncoated with the positive active material layer protrudes from a part coated with the positive active material layer. The part, uncoated with the positive active material layer, of the positive current collector, serves as a positive tab. Using a lithium-ion battery as an example, the positive current collector may be made of aluminum, and a positive active material may be lithium cobalt oxide, lithium iron phosphate, ternary lithium, lithium manganese oxide, or the like. The negative electrode plate includes a negative current collector and a negative active material layer. A surface of the negative current collector is coated with the negative active material layer. Of the negative current collector, a part uncoated with the negative active material layer protrudes from a part coated with the negative active material layer, and the part uncoated with the negative active material layer serves as a negative tab. The negative current collector may be made of copper, and a negative active material may be carbon, silicon, or the like. In order to ensure passage of a large current without fusing off, the positive tab is plural in number, and the plurality of positive tabs are stacked together; the negative tab is plural in number, and the plurality of negative tabs are stacked together.

The development of the battery technology needs to allow for a plurality of design factors, including performance parameters such as energy density, cycle life, discharge capacity, charge rate, and discharge rate, and also needs to ensure safety of the battery cell.

For a jell-roll electrode assembly, the electrode assembly includes a first electrode plate, a separator, and a second electrode plate. The first electrode plate and the second electrode plate are of opposite polarities. The first electrode plate, the separator, and the second electrode plate are stacked and then wound to form a jelly-roll electrode assembly. The applicant hereof finds that, because the separator is relatively thin, the separator is prone to shrink and deform as affected by temperature, thereby leading to failure of the separation function of the separator between the first electrode plate and the second electrode plate. The failure results in direct contact and a short circuit between the first electrode plate and the second electrode plate, and even results in safety accidents such as fire and explosion of the battery cell.

In view of this, an embodiment of this application provides an electrode assembly, in which a second electrode plate is disposed between two first electrode plates. Each of the first electrode plates includes a first composite current collector and a first active material layer. The first active material layer is disposed on a surface that is of the first composite current collector and that is oriented back from the second electrode plate. The first composite current collector is configured to dielectrically isolate the first active material layer from the second electrode plate and allow passage of ions transmitted between the first active material layer and the second electrode plate.

In such an electrode assembly, the insulative isolation between the first active material layer and the second electrode plate is implemented by the first composite current collector of the first electrode plate. The electrode assembly cancels a separator between the first electrode plate and the second electrode plate, avoids a risk of contact and short circuit between the first electrode plate and the second electrode plate caused by shrinkage and deformation of the separator, and can effectively simplify the manufacturing process of the electrode assembly and reduce production costs.

The electrode assembly described in this embodiment of this application is applicable to a battery cell, a battery, and an electrical device that uses the battery.

The electrical device may be a vehicle, a mobile phone, a portable device, a notebook computer, a ship, a spacecraft, an electric toy, a power tool, or the like. The vehicle may be an oil-fueled vehicle, a natural gas vehicle, or a new energy vehicle. The new energy vehicle may be a battery electric vehicle, a hybrid electric vehicle, a range-extended electric vehicle, or the like. The spacecraft includes an airplane, a rocket, a space shuttle, a spaceship, and the like. The electric toy includes a fixed or mobile electric toy, such as a game console, an electric car toy, an electric ship toy, an electric airplane toy, and the like. The power tool includes an electrical metal cutting tool, an electrical grinding tool, an electrical assembling tool, and a power tool for use in railways. Examples of the power tool are an electrical drill, an electrical grinder, an electrical wrench, an electrical screwdriver, an electrical hammer, an electrical impact drill, a concrete vibrator, an electrical planer, and the like. The electrical device is not particularly limited in this embodiment of this application.

For ease of description in the following embodiments, a vehicle is used as an example of the electrical device.

Figure 1:
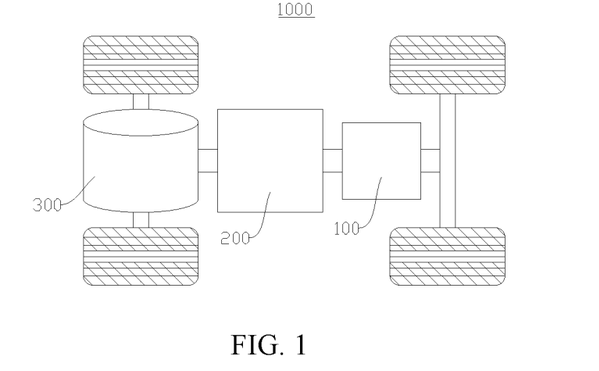
FIG. 1 is a schematic structural diagram of a vehicle according to some embodiments of this application.

Referring to FIG. 1, FIG. 1 is a schematic structural diagram of a vehicle 1000 according to some embodiments of this application. A battery 100 is disposed inside the vehicle 1000. The battery 100 may be disposed at the bottom, front, or rear of the vehicle 1000. The battery 100 may be configured to supply power to the vehicle 1000. For example, the battery 100 may serve as an operating power supply of the vehicle 1000.

The vehicle 1000 may further include a controller 200 and a motor 300. The controller 200 is configured to control the battery 100 to supply power to the motor 300, for example, to meet electrical energy requirements in starting, navigating, or running the vehicle 1000.

In some embodiments of this application, the battery 100 serves not only as an operating power supply of the vehicle 1000, but may also serve as a drive power supply of the vehicle 1000 to provide driving power for the vehicle 1000 in place of or partly in place of oil or natural gas.

Figure 2:
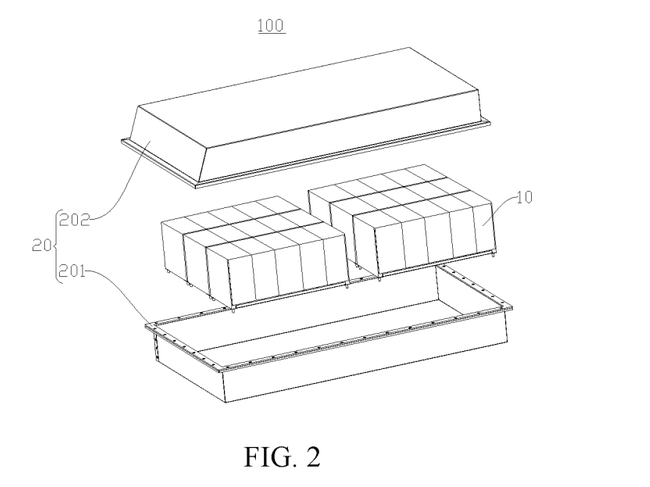
FIG. 2 is an exploded view of a battery according to some embodiments of this application.

Referring to FIG. 2, FIG. 2 is an exploded view of a battery 100 according to some embodiments of this application. The battery 100 includes a battery cell 10 and a box 20. The box 20 is configured to accommodate the battery cell 10.

The box 20 is a component configured to accommodate the battery cell 10. The box 20 provides an accommodation space for the battery cell 10. The box 20 may be in various structures. In some embodiments, the box 20 may include a first part 201 and a second part 202. The first part 201 and the second part 202 fit and cover each other to define the accommodation space configured to accommodate the battery cell 10. The first part 201 and the second part 202 may be in various shapes, such as a cuboid or cylinder. The first part 201 may be a hollow structure opened up at one side. The second part 202 may also be a hollow structure opened up at one side. The open-up side of the second part 202 fits and covers the open-up side of the first part 201 to form the box 20 that provides the accommodation space. Alternatively, the first part 201 is a hollow structure opened up at one side, and the second part 202 is a plate-shaped structure. The second part 202 fits and covers the open-up side of the first part 201 to form the box 20 that provides the accommodation space. A junction between the first part 201 and the second part 202 may be sealed by a sealing element. The sealing element may be a sealing ring, a sealant, or the like.

There may be one or more battery cells 10 in the battery 100. If there are a plurality of battery cells 10, the plurality of battery cells 10 may be connected in series, parallel, or series-and-parallel pattern. The series-and-parallel pattern means a combination of series connection and parallel connection of the plurality of battery cells 10. The plurality of battery cells 10 are connected in series, parallel, or series-and-parallel pattern to form a battery module first, and then a plurality of battery modules are connected in series, parallel, or series-and-parallel pattern to form an entirety that is to be accommodated in the box 20. Alternatively, all battery cells 10 are directly connected in series, parallel, or series-and-parallel pattern, and then the entirety of all battery cells 10 is accommodated in the box 20.

In some embodiments, the battery 100 may further include a busbar component. The plurality of battery cells 10 may be electrically connected by the busbar component, so as to implement series, parallel, or series-and-parallel connection between the plurality of battery cells 10. The busbar component may be a metal conductor, such as copper, iron, aluminum, stainless steel, or an aluminum alloy.

Figure 3:
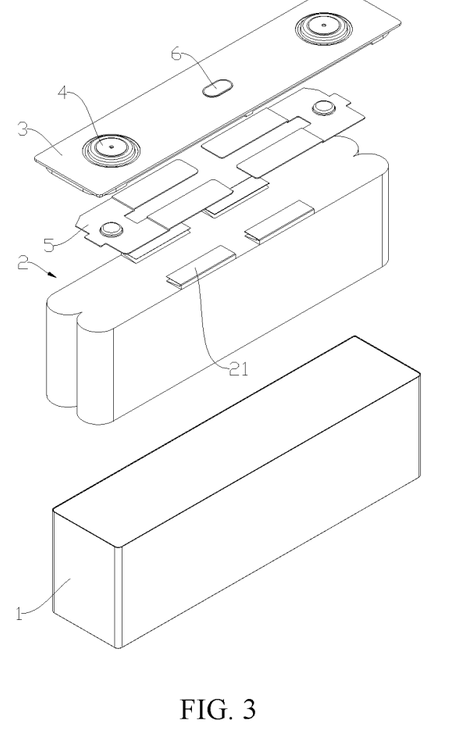
FIG. 3 is an exploded view of a battery cell according to some embodiments of this application.

Referring to FIG. 3, FIG. 3 is an exploded view of a battery cell 10 according to some embodiments of this application. The battery cell 10 includes a housing 1, an electrode assembly 2, and an end cap 3.

The housing 1 is a component configured to accommodate the electrode assembly 2. The housing 1 may be a hollow structure opened at one end, or, the housing 1 may be a hollow structure opened at two opposite ends. The housing 1 may be in various shapes such as a cylinder or cuboid. The housing 1 may be made of a variety of materials such as copper, iron, aluminum, steel, or an aluminum alloy.

The electrode assembly 2 is a component that reacts with an electrolytic solution electrochemically in the battery cell 10. The electrode assembly 2 includes tabs 21. The tabs 21 include a positive tab and a negative tab. The positive tab may be a part uncoated with the positive active material layer in the positive electrode plate, and the negative tab may be a part uncoated with the negative active material layer in the negative electrode plate.

The end cap 3 is a component that fits and covers the opening of the housing 1 to isolate the internal environment of the battery cell 10 from the external environment. The shape of the end cap 3 may fit the shape of the housing 1. For example, the housing 1 is a cuboidal structure, and the end cap 3 is a rectangular plate-shaped structure that fits the housing 1. For another example, the housing 1 is a cylindrical structure, and the end cap 3 is a circular plate-shaped structure that fits the housing 1. The end cap 3 may be made of a variety of materials such as copper, iron, aluminum, steel, or an aluminum alloy.

There may be one or two end caps 3 in the battery cell 10. If the housing 1 is a hollow structure opened at one end, one end cap 3 may be disposed accordingly. If the housing 1 is a hollow structure opened at both ends, two end caps 3 may be disposed accordingly. The two end caps 3 fit and cover the openings at the two ends of the housing 1 respectively.

Electrode terminals 4 may be disposed on the end cap 3. The electrode terminals 4 are configured to be electrically connected to the tabs 21 of the electrode assembly 2, so as to output electrical energy of the battery cell 10. The electrode terminals 4 may be directly or indirectly connected to the tabs 21 of the electrode assembly 2.

As shown in FIG. 3, in an example in which the battery cell 10 includes one end cap 3, two electrode terminals 4 are disposed on the end cap 3. The two electrode terminals 4 are a positive electrode terminal and a negative electrode terminal respectively. The positive electrode terminal is electrically connected to the positive tab by one current collecting member 5, and the negative electrode terminal is electrically connected to the negative tab by another current collecting member 5.

A pressure relief mechanism 6 may be disposed on the end cap 3. The pressure relief mechanism 6 is configured to be actuated to release pressure inside the battery cell 10 when an internal pressure or temperature of the battery cell 10 reaches a threshold.

The term "actuated" means that the pressure relief mechanism 6 performs an action or is activated to a given state so that the internal pressure and temperature of the battery cell 10 is relieved. The actions performed by the pressure relief mechanism 6 may include, but are not limited to rupturing, shattering, tearing, or bursting open at least a part of the pressure relief mechanism 6, or the like. When the pressure relief mechanism 6 is actuated, high-temperature and high-pressure substances inside the battery cell 10 are expelled as emissions out of the actuated position. In this way, the pressure and temperature of the battery cell 10 are relieved under a circumstance of a controllable pressure or temperature to avoid potential severer accidents.

The pressure relief mechanism 6 may be a component such as an explosion-proof valve, a rupture disk, a gas valve, a pressure relief valve, or a safety valve.

Next, the specific structure of the electrode assembly 2 according to some embodiments of this application is described in detail.

Figure 4:
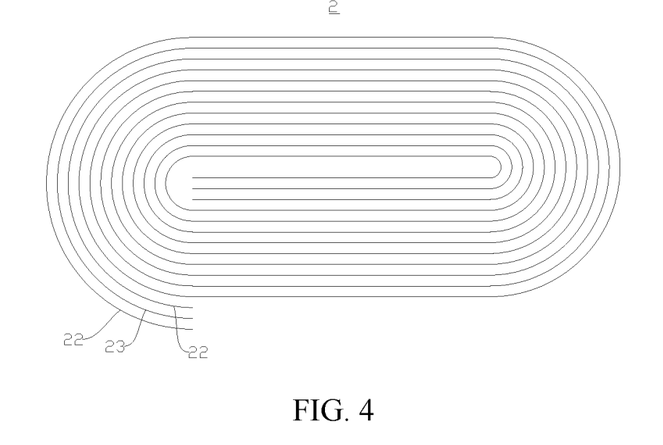
FIG. 4 is a schematic structural diagram of an electrode assembly according to some embodiments of this application.
Figure 5:
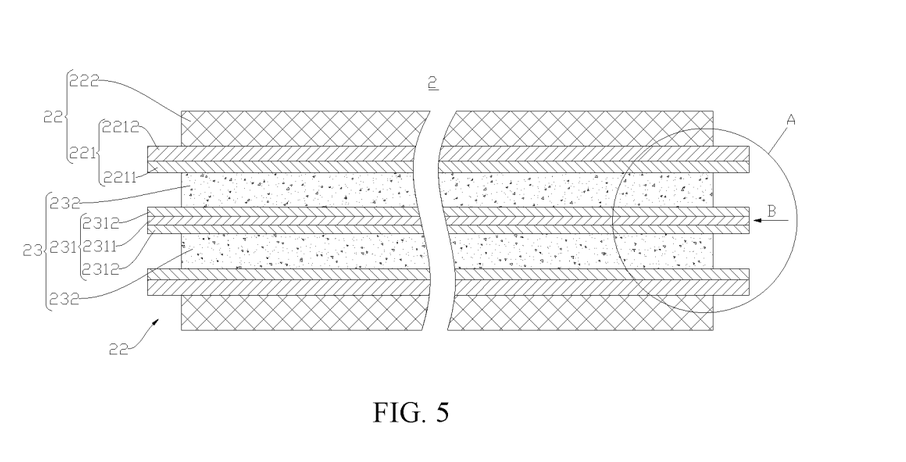
FIG. 5 is an expanded view of the electrode assembly shown in FIG. 4.

Referring to FIG. 4 and FIG. 5, FIG. 4 is a schematic structural diagram of an electrode assembly 2 according to some embodiments of this application, and FIG. 5 is an expanded view of the electrode assembly 2 shown in FIG. 4. An embodiment of this application provides an electrode assembly 2. The electrode assembly includes first electrode plates 22 and a second electrode plate 23 that are of opposite polarities. The second electrode plate 23 and two first electrode plates 22 are stacked and wound to form the electrode assembly 2. The second electrode plate 23 is located between the two first electrode plates 22.

Each of the first electrode plates 22 includes a first composite current collector 221 and a first active material layer 222. The first active material layer 222 is disposed on a surface that is of the first composite current collector 221 and that is oriented back from the second electrode plate 23. The first composite current collector 221 is configured to dielectrically isolate the first active material layer 222 from the second electrode plate 23 and allow passage of ions transmitted between the first active material layer 222 and the second electrode plate 23.

The first electrode plate 22 and the second electrode plate 23 are two electrode plates of opposite polarities. When the first electrode plate 22 is a positive electrode plate, the second electrode plate 23 is a negative electrode plate. When the first electrode plate 22 is a negative electrode plate, the second electrode plate 23 is a positive electrode plate. What is located between the two first electrode plates 22 may be one second electrode plates 23, or may be a plurality of second electrode plates stacked together. As an example, in FIG. 5, one second electrode plate 23 is located between the two first electrode plates 22. The electrode plates are stacked together in a sequence from one first electrode plate 22 to the second electrode plate 23 and then to the other first electrode plate 22, and then wound to form the electrode assembly 2 shown in FIG. 4.

The first electrode plate 22 is a single-side-coated electrode plate. That is, just a single surface of the first composite current collector 221 of the first electrode plate 22 is coated with the first active material layer 222. The first composite current collector 221 is capable of insulation and current collection, and allowing passage of ions. The first composite current collector 221 may be of a multi-layer structure in which different layers implement the functions of insulation and current collection respectively. The first active material layer 222 may be a positive active material layer or a negative active material layer. If the first electrode plate 22 is a positive electrode plate, the first active material layer 222 is a positive active material layer. If the first electrode plate 22 is a negative electrode plate, the first active material layer 222 is a negative active material layer.

In an example in which the first active material layer 222 is a positive active material layer, an active material in the first active material layer 222 may be lithium cobalt oxide, lithium iron phosphate, ternary lithium, lithium manganese oxide, or the like. In an example in which the first active material layer 222 is ternary lithium, a process of preparing the first electrode plate 22 may be: mixing well the positive active material $LiNi_{1/3}Co_{1/3}Mn_{1/3}O_2$ (NCM333), conductive carbon black, and polyvinylidene difluoride (PVDF) as a binder at a weight ratio of 93:2:5 in an appropriate amount of N-methyl-pyrrolidone (NMP) solvent to form a homogeneous positive slurry; and coating a single surface of the first composite current collector 221 with the positive slurry, and performing steps such as drying to obtain a first electrode plate 22.

The ions transmitted between the first active material layer 222 and the second electrode plate 23 may be lithium ions, sodium ions, or the like. For example, when the battery cell 10 is a lithium-ion battery, the ions transmitted between the first active material layer 222 and the second electrode plate 23 are lithium ions. For another example, when the battery cell 10 is a sodium-ion battery, the ions transmitted between the first active material layer 222 and the second electrode plate 23 are sodium ions.

In this embodiment of this application, the second electrode plate 23 is located between the two first electrode plates 22, and the first electrode plate 22 adopts a structure that includes a first composite current collector 221 and a first active material layer 222. The first active material layer 222 is disposed on a surface that is of the first composite current collector 221 and that is oriented back from the second electrode plate 23. The first composite current collector 221 serves a function of dielectrically isolating the first active material layer 222 from the second electrode plate 23. The first composite current collector 221 also serves functions of collecting current and allowing passage of ions transmitted between the first active material layer 222 and the second electrode plate 23, and ensures normal transmission of the ions between the first electrode plate 22 and the second electrode plate 23. The electrode assembly 2 of this structure cancels a separator between the first electrode plate 22 and the second electrode plate 23, avoids a risk of contact and short circuit between the first electrode plate 22 and the second electrode plate 23 caused by shrinkage and deformation of the separator, improves safety, and can effectively simplify the manufacturing process of the electrode assembly 2 and reduce production costs.

In addition, the first composite current collector 221 is capable of allowing passage of ions, thereby shortening a transmission path of the ions between the first electrode plate 22 and the second electrode plate 23, and effectively improving the charge rate and the discharge rate.

In some embodiments, still referring to FIG. 5, the first composite current collector 221 includes a first insulative layer 2211 and a first conductive layer 2212 that are stacked. The first insulative layer 2211 is located between the first conductive layer 2212 and the second electrode plate 23, and the first insulative layer 2211 is configured to dielectrically isolate the first conductive layer 2212 from the second electrode plate 23. The first active material layer 222 is disposed on a surface that is of the first conductive layer 2212 and that is oriented back from the first insulative layer 2211.

The first insulative layer 2211 and the first conductive layer 2212 are compounded together. Both the first insulative layer 2211 and the first conductive layer 2212 are capable of allowing passage of ions.

The first insulative layer 2211 is made of an insulative material, and may be a microporous film that allows passage of ions. The pores in the first insulative layer 2211 may be fibrous pores. The first insulative layer 2211 may be made of a material that is one or more of a polymer material or a polymer-based composite material. The polymer material may be one or more of polyamide, polyimide, polyethylene terephthalate, polybutylene terephthalate, polyethylene naphthalate, polycarbonate, polyethylene, polypropylene, polyphenylene ether, poly(acrylonitrile-co-butadiene-co-styrene), polyvinyl alcohol, polystyrene, polyvinyl chloride, polyvinylidene difluoride, polytetrafluoroethylene, poly(sodium-p-styrenesulfonate), polyacetylene, silicone rubber, polyoxymethylene, polyphenylene oxide, polyphenylene sulfide, polyethylene glycol, polythiaxyl, polyphenyl, polypyrrole, polyaniline, polythiophene, polypyridine, cellulose, starch, protein, epoxy resin, phenol resin, a derivative thereof, a crosslinked polymer thereof, or a copolymer thereof. The polymer-based composite material includes a polymer material and an additive. The additive may be one or one of a metal material or an inorganic nonmetal material.

The first conductive layer 2212 is electrically conductive, and may be a porous structure to allow passage of ions. The first conductive layer 2212 may be a single-layer metal conductor. For example, the first conductive layer 2212 is a single-layer copper sheet, a single-layer aluminum sheet, or the like. Alternatively, the first conductive layer 2212 may be a multi-layer composite structure, in which at least one layer is a metal conductor.

In this embodiment, the first insulative layer 2211 and the first conductive layer 2212 are stacked. The first conductive layer 2212 can reinforce the first insulative layer 2211 so that the first insulative layer 2211 is not prone to be deformed by shrinkage. The first insulative layer 2211 serves a function of dielectrically isolating the first conductive layer 2212 from the second electrode plate 23, and the first conductive layer 2212 serves a function of collecting current. That is, the first composite current collector 221 compounded of the first insulative layer 2211 and the first conductive layer 2212 serves functions of a separator and a current collector.

In some embodiments, an air permeability of the first insulative layer 2211 is 50 to 3000 s/100 cc.

When the air permeability of the first insulative layer 2211 is excessively high, the ions in the electrolytic solution are unable to pass through the first insulative layer 2211, so that high ion-conductivity fails to be implemented. When the air permeability of the first insulative layer 2211 is excessively low, large particles can also pass through the first insulative layer 2211, so that the first insulative layer 2211 loses the isolation performance.

In this embodiment, the air permeability of the first insulative layer 2211 is set to 50 to 3000 s/100 cc. In this way, it is ensured that the ions transmitted between the first active material layer 222 and the second electrode plate 23 can pass through the first insulative layer 2211 smoothly, and that the first insulative layer 2211 can block large particles.

In some embodiments, a porosity of the first conductive layer 2212 is 10% to 95%.

The porosity of the first conductive layer 2212 means a percentage of a total volume of pores in the first conductive layer 2212 in a total volume of the first conductive layer 2212.

In this embodiment, the porosity of the first conductive layer 2212 is set to 10% to 95% so as to meet the requirement of a relatively high ion conductivity and achieve a relatively high pass rate of ions.

In some embodiments, a thickness of the first conductive layer 2212 is 200 to 3000 nm.

If the first conductive layer 2212 is a single-layer metal conductor, the thickness of the metal conductor is 200 to 3000 nm. If the first conductive layer 2212 is also a multi-layer composite structure, the total thickness of the multi-layer composite structure is 200 to 3000 nm.

Optionally, the thickness of the first conductive layer 2212 is 500 to 1500 nm.

In this embodiment, when the thickness of the first conductive layer 2212 falls within the range of 200 to 3000 nm, the first conductive layer 2212 is of relatively high conductivity and high strength.

Figure 6:
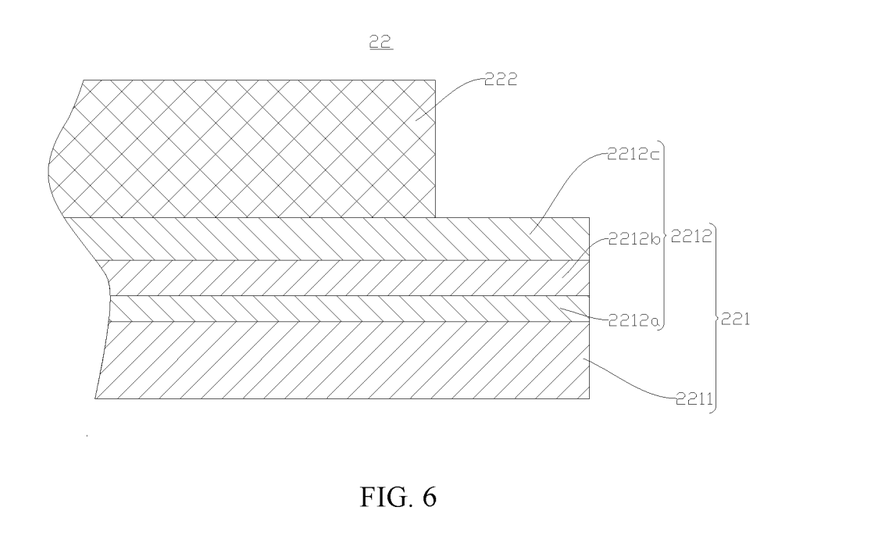
FIG. 6 is a close-up view of a first electrode plate shown in FIG. 5.

In some embodiments, referring to FIG. 6, FIG. 6 is a close-up view of the first electrode plate 22 shown in FIG. 5. The first conductive layer 2212 includes a first transition layer 2212a, a first thickening layer 2212b, and a first functional layer 2212c that are stacked in sequence. The first transition layer 2212a is located between the first insulative layer 2211 and the first thickening layer 2212b. The first active material layer 222 is disposed on a surface that is of the first functional layer 2212c and that is oriented back from the first thickening layer 2212b.

The first transition layer 2212a, the first thickening layer 2212b, and the first functional layer 2212c may all be porous structures to allow passage of ions. The first functional layer 2212c is a conductive layer capable of current collection, and may be a metal sheet, such as a copper sheet, an aluminum sheet, or the like. The first thickening layer 2212b serves to increase the thickness of the first conductive layer 2212. The first transition layer 2212a serves to connect the first insulative layer 2211 and the first thickening layer 2212b. The first transition layer 2212a and the first thickening layer 2212b may be conductive layers or non-conductive layers. During preparation, the surface of the first functional layer 2212c may be coated with the first thickening layer 2212b first, and then the surface of the first thickening layer may be coated with the first transition layer 2212a.

In an example, the thickness of the first functional layer 2212c is greater than the thickness of the first thickening layer 2212b, and the thickness of the first thickening layer 2212b is greater than the thickness of the first transition layer 2212a.

In this embodiment, the first transition layer 2212a is located between the first insulative layer 2211 and the first thickening layer 2212b. The first transition layer 2212a serves a function of connecting the first insulative layer 2211 and the first thickening layer 2212b to implement the compounding of the first conductive layer 2212 and the first insulative layer 2211. The first thickening layer 2212b disposed in the first conductive layer 2212 increases the thickness of the first conductive layer 2212 and the strength of the first conductive layer 2212.

Figure 7:
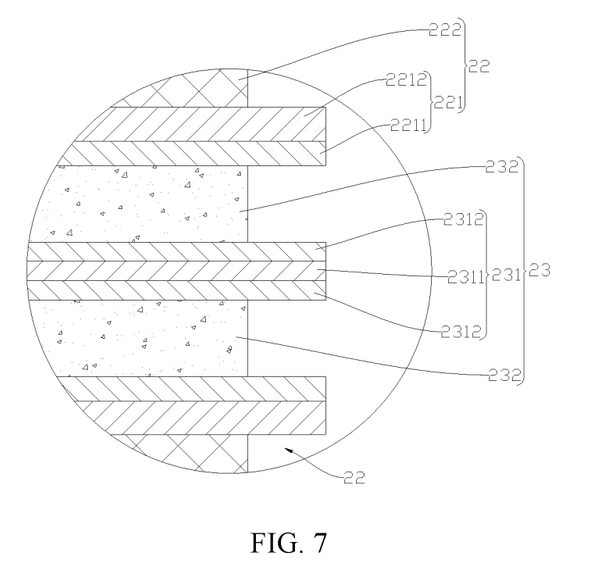
FIG. 7 is a close-up view of a position A of the electrode assembly shown in FIG. 5.

In some embodiments, referring to FIG. 7, FIG. 7 is a close-up view of a position A of the electrode assembly 2 shown in FIG. 5. The second electrode plate 23 includes a current collector and a second active material layer 232. The second active material layer 232 is disposed on two opposite surfaces of the current collector. The first composite current collector 221 is located between the first active material layer 222 and the second active material layer 232. The first composite current collector 221 is configured to dielectrically isolate the first active material layer 222 from the second active material layer 232 and allow passage of ions transmitted between the first active material layer 222 and the second active material layer 232.

The second electrode plate 23 is a double-side-coated electrode plate. That is, both of the two opposite surfaces of the current collector of the second electrode plate 23 are coated with the second active material layer 232. The second active material layer 232 may be a positive active material layer or a negative active material layer. If the second electrode plate 23 is a positive electrode plate, the second active material layer 232 is a positive active material layer. If the second electrode plate 23 is a negative electrode plate, the second active material layer 232 is a negative active material layer.

In an example in which the second active material layer 232 is a negative active material layer, an active material in the second active material layer 232 may be carbon, silicon, or the like. In an example in which the second active material layer 232 is carbon, a process of preparing the second electrode plate 23 may be: mixing well graphite as a negative active material, conductive carbon black, sodium carboxymethyl cellulose (CMC-Na) as a thickener, styrene-butadiene rubber (SBR) as a binder at a weight ratio of 96.5:1.0:1.0:1.5 in an appropriate amount of deionized water to form a homogeneous negative slurry; and coating both a front side and a back side of the current collector of the second electrode plate 23 with the negative slurry, and performing steps such as drying to obtain a second electrode plate 23.

The current collector in the second electrode plate 23 may be an ordinary current collector, such as a non-porous metal sheet. Alternatively, the current collector in the second electrode plate 23 may be a single-layer porous current collector, such as a single-layer porous metal sheet. Alternatively, the current collector in the second electrode plate 23 may be a composite current collector. If the current collector in the second electrode plate 23 is a single-layer porous current collector or a composite current collector, the second electrode plate 23 is capable of allowing passage of ions, thereby improving the infiltration effect of the electrolytic solution.

In this embodiment, both sides of the current collector in the second electrode plate 23 are coated with a second active material layer 232. Therefore, ions can be shuttled between each of the two first active material layers 222 in the two first electrode plates 22 and the corresponding one of the two second active material layers 232 of the second electrode plate 23, thereby increasing the energy density effectively, shortening the transmission path between the first active material layer 222 and the second active material layer 232, and improving the charge rate and discharge rate.

In other embodiments, in the second electrode plate 23, just one surface of the current collector is coated with the second active material layer 232. In this case, the current collector may be a single-layer porous current collector or a composite current collector. In this way, ions can be transmitted between the second active material layer 232 and the first active material layers 222 of both first electrode plates 22.

In some embodiments, still referring to FIG. 7, the current collector in the second electrode plate 23 is a second composite current collector 231 that allows passage of ions.

The second composite current collector 231 is capable of insulation and current collection, and allowing passage of ions. The second composite current collector 231 may be of a multi-layer structure in which different layers implement the functions of insulation and current collection respectively.

In this embodiment, the current collector in the second electrode plate 23 is a second composite current collector 231, thereby improving the ionic conductivity and the effect of the electrolytic solution in infiltrating the second electrode plate 23.

In some embodiments, still referring to FIG. 7, the second composite current collector 231 includes a second insulative layer 2311 and a second conductive layer 2312 that are stacked. The second conductive layer 2312 is disposed on two opposite surfaces of the second insulative layer 2311, and the second active material layer 232 is disposed on a surface that is of the second conductive layer 2312 and that is oriented back from the second insulative layer 2311.

The second insulative layer 2311 and the second conductive layer 2312 are compounded together. Both the second insulative layer 2311 and the second conductive layer 2312 are capable of allowing passage of ions.

The second insulative layer 2311 is made of an insulative material, and may be a microporous film that allows passage of ions. The pores in the second insulative layer 2311 may be fibrous pores. The second insulative layer 2311 may also be made of a material that is one or more of a polymer material or a polymer-based composite material.

The second conductive layer 2312 is electrically conductive, and may be a porous structure to allow passage of ions. The second conductive layer 2312 may be a single-layer metal conductor. For example, the second conductive layer 2312 is a single-layer copper sheet, a single-layer aluminum sheet, or the like. Alternatively, the second conductive layer 2312 may be a multi-layer composite structure, in which at least one layer is a metal conductor.

In this embodiment, both of the two opposite surfaces of the second insulative layer 2311 are coated with the second conductive layer 2312. The second conductive layer 2312 can reinforce the second insulative layer 2311 so that the second insulative layer 2311 is not prone to be deformed by shrinkage. The second composite current collector 231 compounded of the second insulative layer 2311 and the two second conductive layers 2312 serves functions of a separator and a current collector.

In some embodiments, an air permeability of the second insulative layer 2311 is 50 to 3000 s/100 cc. In this way, it is ensured that the electrolytic solution can pass through the second conductive layer 2312 quickly, thereby improving the effect of the electrolytic solution in infiltrating the second electrode plate 23.

In some embodiments, a porosity of the second conductive layer 2312 is 10% to 95%.

The porosity of the second conductive layer 2312 means a percentage of a total volume of pores in the second conductive layer 2312 in a total volume of the second conductive layer 2312.

In this embodiment, the porosity of the second conductive layer 2312 is set to 10% to 95% so as to meet the requirement of a relatively high ion conductivity and achieve a relatively high pass rate of ions. In this way, it is ensured that the electrolytic solution can pass through the second conductive layer 2312 quickly, thereby improving the effect of the electrolytic solution in infiltrating the second electrode plate 23.

In some embodiments, a thickness of the second conductive layer 2312 is 200 to 3000 nm.

If the second conductive layer 2312 is a single-layer metal conductor, the thickness of the metal conductor is 200 to 3000 nm. If the second conductive layer 2312 is also a multi-layer composite structure, the total thickness of the multi-layer composite structure is 200 to 3000 nm.

Optionally, the thickness of the second conductive layer 2312 is 500 to 1500 nm.

In this embodiment, when the thickness of the second conductive layer 2312 falls within the range of 200 to 3000 nm, the second conductive layer 2312 is of relatively high conductivity and high strength.

Figure 8:
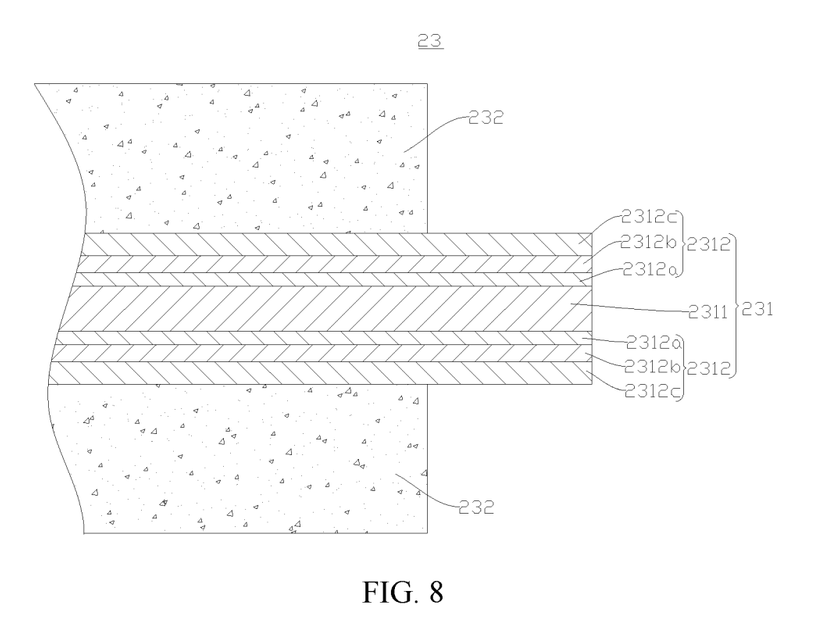
FIG. 8 is a close-up view of a second electrode plate shown in FIG. 5.

In some embodiments, referring to FIG. 8, FIG. 8 is a close-up view of the second electrode plate 23 shown in FIG. 5. The second conductive layer 2312 includes a second transition layer 2312a, a second thickening layer 2312b, and a second functional layer 2312c that are stacked in sequence. The second transition layer 2312a is located between the second insulative layer 2311 and the second thickening layer 2312b. The second active material layer 232 is disposed on a surface that is of the second functional layer 2312c and that is oriented back from the second thickening layer 2312b.

The second transition layer 2312a, the second thickening layer 2312b, and the second functional layer 2312c may all be porous structures to allow passage of ions. The second functional layer 2312c is a conductive layer capable of current collection, and may be a metal sheet, such as a copper sheet, an aluminum sheet, or the like. The second thickening layer 2312b serves to increase the thickness of the second conductive layer 2312. The second transition layer 2312a serves to connect the second insulative layer 2311 and the second thickening layer 2312b. The second transition layer 2312a and the second thickening layer 2312b may be conductive layers or non-conductive layers. During preparation, the surface of the second functional layer 2312c may be coated with the second thickening layer 2312b first, and then the surface of the second thickening layer may be coated with the second transition layer 2312a.

In an example, the thickness of the second functional layer 2312c is greater than the thickness of the second thickening layer 2312b, and the thickness of the second thickening layer 2312*b* is greater than the thickness of the second transition layer 2312*a*.

In this embodiment, the second transition layer 2312*a* is located between the second insulative layer 2311 and the second thickening layer 2312*b*. The second transition layer 2312*a* serves a function of connecting the second insulative layer 2311 and the second thickening layer 2312*b* to implement the compounding of the second conductive layer 2312 and the second insulative layer 2311. The second thickening layer 2312*b* disposed in the second conductive layer 2312 increases the thickness of the second conductive layer 2312 and the strength of the second conductive layer 2312.

Figure 9:
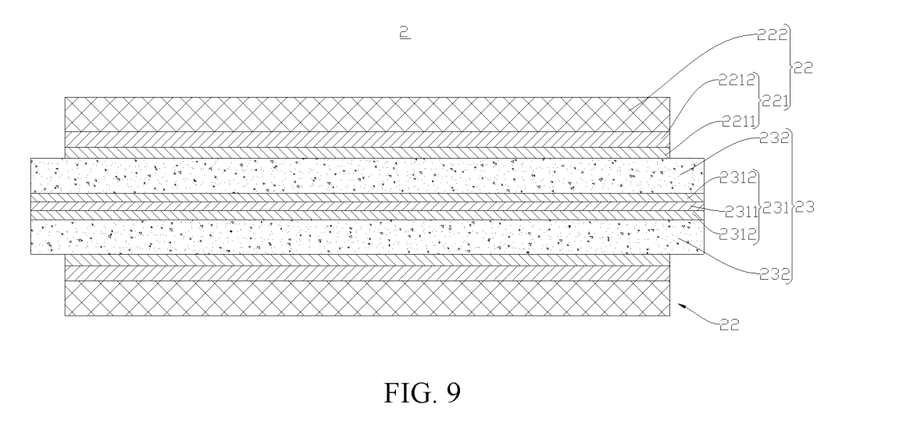
FIG. 9 is a direction-B view of the electrode assembly shown in FIG. 5.

In some embodiments, referring to FIG. 9, FIG. 9 is a direction-B view of the electrode assembly 2 shown in FIG. 5, in which the first electrode plate 22 is a positive electrode plate, and the second electrode plate 23 is a negative electrode plate. A width of the second active material layer 232 is greater than a width of the first active material layer 222.

The width of the first active material layer 222 is a dimension of the first active material layer 222 in a width direction of the first electrode plate 22. The width of the second active material layer 232 is a dimension of the second active material layer 232 in a width direction of the second electrode plate 23. The width direction of the first electrode plate 22 is consistent with the width direction of the second electrode plate 23.

As an example, in the width direction of the first electrode plate 22, both ends of the second active material layer 232 go beyond the first active material layer 222.

In this embodiment, the width of the second active material layer 232 of the negative electrode plate is greater than the width of the first active material layer 222 of the positive electrode plate, thereby increasing space available for intercalating ions in the second active material layer 232, and reducing occurrences of lithium plating.

An embodiment of this application provides a battery cell 10, including a housing and the electrode assembly 2 according to any embodiment described above. The housing is configured to accommodate the electrode assembly 2.

An embodiment of this application provides a battery 100, including a box 20 and the battery cell 10 according to any embodiment described above. The box 20 is configured to accommodate the battery cell 10.

An embodiment of this application provides an electrical device, including the battery 100 according to any embodiment described above.

The electrical device may be any device in which the battery 100 is applied.

Further, referring to FIG. 4 and FIG. 5, an embodiment of this application provides a jelly-roll electrode assembly 2, including first electrode plates 22 and a second electrode plate 23. One second electrode plate 23 and two first electrode plates 22 are stacked and wound to form the electrode assembly 2. The second electrode plate 23 is located between the two first electrode plates 22. Each of the first electrode plates 22 includes a first composite current collector 221 and a first active material layer 222. The first active material layer 222 is disposed on a surface that is of the first composite current collector 221 and that is oriented back from the second electrode plate 23. The second electrode plates 23 includes a second composite current collector 231 and a second active material layer 232. The second active material layer 232 is disposed on two opposite surfaces of the second composite current collector 231. The first composite current collector 221 is located between the first active material layer 222 and the second active material layer 232. The electrode assembly 2 of this structure cancels a separator between the first electrode plate 22 and the second electrode plate 23, avoids a risk of contact and short circuit between the first electrode plate 22 and the second electrode plate 23 caused by shrinkage and deformation of the separator, and can effectively simplify the manufacturing process of the electrode assembly 2 and reduce production costs.

Figure 10:
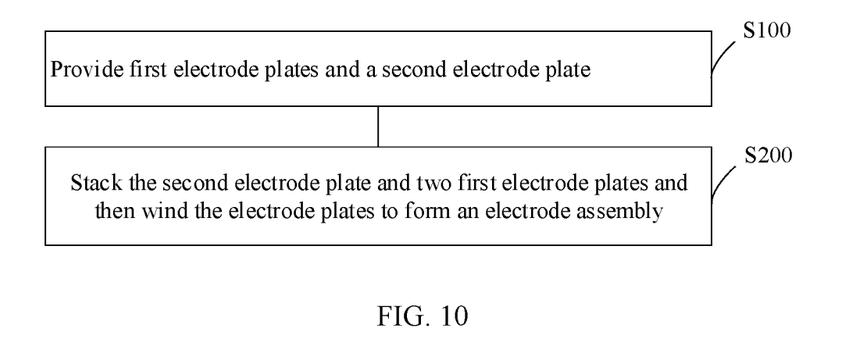
FIG. 10 is a flowchart of a method for manufacturing an electrode assembly according to some embodiments of this application.

Referring to FIG. 10, FIG. 10 is a flowchart of a method for manufacturing an electrode assembly 2 according to some embodiments of this application. An embodiment of this application provides a method for manufacturing an electrode assembly 2. The manufacturing method includes the following steps:

S100: Provide first electrode plates 22 and a second electrode plate 23;

S200: Stack the second electrode plate 23 and two first electrode plates 22 and then wind the electrode plates to form the electrode assembly 2.

The first electrode plates 22 are of a polarity opposite to the second electrode plate 23. The second electrode plate 23 is located between the two first electrode plates 22. Each of the first electrode plates 22 includes a first composite current collector 221 and a first active material layer 222. The first active material layer 222 is disposed on a surface that is of the first composite current collector 221 and that is oriented back from the second electrode plate 23. The first composite current collector 221 is configured to dielectrically isolate the first active material layer 222 from the second electrode plate 23 and allow passage of ions transmitted between the first active material layer 222 and the second electrode plate 23.

It is hereby noted that, for the related structure of the electrode assembly 2 manufactured by the manufacturing method according to the foregoing embodiment, reference may be made to the descriptions of the electrode assembly 2 provided in the foregoing embodiments, details of which are omitted herein.

Figure 11:
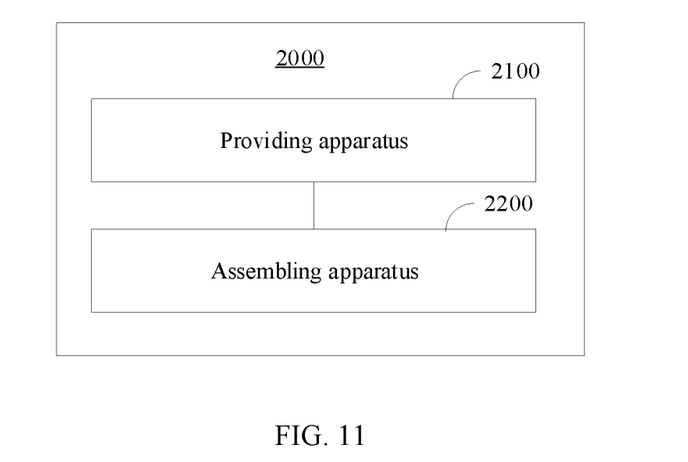
FIG. 11 is a schematic block diagram of a device for manufacturing an electrode assembly according to some embodiments of this application.

Further, referring to FIG. 11, FIG. 11 is a schematic block diagram of a device 2000 for manufacturing an electrode assembly 2 according to some embodiments of this application. An embodiment of this application further provides a device 2000 for manufacturing an electrode assembly 2. The manufacturing device 2000 includes a providing apparatus 2100 and an assembling apparatus 2200. The providing apparatus 2100 is configured to provide first electrode plates 22 and a second electrode plate 23. The assembling apparatus 2200 is configured to stack the second electrode plate 23 and two first electrode plates 22 and then wind the electrode plates to form the electrode assembly 2.

The first electrode plates 22 are of a polarity opposite to the second electrode plate 23. The second electrode plate 23 is located between the two first electrode plates 22. Each of the first electrode plates 22 includes a first composite current collector 221 and a first active material layer 222. The first active material layer 222 is disposed on a surface that is of the first composite current collector 221 and that is oriented back from the second electrode plate 23. The first composite current collector 221 is configured to dielectrically isolate the first active material layer 222 from the second electrode plate 23 and allow passage of ions transmitted between the first active material layer 222 and the second electrode plate 23.

It is hereby noted that, for the related structure of the electrode assembly 2 manufactured by the manufacturing device 2000 according to the foregoing embodiment, reference may be made to the descriptions of the electrode assembly 2 provided in the foregoing embodiments, details of which are omitted herein.

It is hereby noted that to the extent that no conflict occurs, the embodiments of this application and the features in the embodiments may be combined with each other.

The foregoing embodiments are just intended to describe the technical solutions of this application, but not to limit this application. To a person skilled in the art, various modifications and variations may be made to this application. Any modifications, equivalent replacements, improvements, and the like made without departing from the spirit and principles of this application still fall within the protection scope of this application.

What is claimed is:

1. An electrode assembly, comprising first electrode plates and a second electrode plate that are of opposite polarities, wherein the second electrode plate and two first electrode plates are stacked and wound to form the electrode assembly, and the second electrode plate is located between the two first electrode plates, wherein
   each of the first electrode plates comprises a first composite current collector and a first active material layer, the first active material layer is disposed on a surface that is of the first composite current collector and that is oriented back from the second electrode plate, and the first composite current collector is configured to dielectrically isolate the first active material layer from the second electrode plate and allow passage of ions transmitted between the first active material layer and the second electrode plate.

2. The electrode assembly according to claim 1, wherein the first composite current collector comprises a first insulative layer and a first conductive layer that are stacked;
   the first insulative layer is located between the first conductive layer and the second electrode plate, and the first insulative layer is configured to dielectrically isolate the first conductive layer from the second electrode plate; and
   the first active material layer is disposed on a surface that is of the first conductive layer and that is oriented back from the first insulative layer.

3. The electrode assembly according to claim 2, wherein an air permeability of the first insulative layer is 50 to 3000 s/100 cc.

4. The electrode assembly according to claim 2, wherein a porosity of the first conductive layer is 10% to 95%.

5. The electrode assembly according to claim 2, wherein a thickness of the first conductive layer is 200 to 3000 nm.

6. The electrode assembly according to claim 2, wherein the first conductive layer comprises a first transition layer, a first thickening layer, and a first functional layer that are stacked in sequence, the first transition layer is located between the first insulative layer and the first thickening layer, and the first active material layer is disposed on a surface that is of the first functional layer and that is oriented back from the first thickening layer.

7. The electrode assembly according to claim 1, wherein the second electrode plate comprises a current collector and a second active material layer, and the second active material layer is disposed on two opposite surfaces of the current collector, wherein
   the first composite current collector is located between the first active material layer and the second active material layer, the first composite current collector is configured to dielectrically isolate the first active material layer from the second active material layer and allow passage of ions transmitted between the first active material layer and the second active material layer.

8. The electrode assembly according to claim 7, wherein the current collector in the second electrode plate is a second composite current collector that allows passage of ions.

9. The electrode assembly according to claim 8, wherein the second composite current collector comprises a second insulative layer and a second conductive layer that are stacked; and
   the second conductive layer is disposed on two opposite surfaces of the second insulative layer, and the second active material layer is disposed on a surface that is of the second conductive layer and that is oriented back from the second insulative layer.

10. The electrode assembly according to claim 9, wherein an air permeability of the second insulative layer is 50 to 3000 s/100 cc.

11. The electrode assembly according to claim 9, wherein a porosity of the second conductive layer is 10% to 95%.

12. The electrode assembly according to claim 9, wherein a thickness of the second conductive layer is 200 to 3000 nm.

13. The electrode assembly according to claim 9, wherein the second conductive layer comprises a second transition layer, a second thickening layer, and a second functional layer that are stacked in sequence, the second transition layer is located between the second insulative layer and the second thickening layer, and the second active material layer is disposed on a surface that is of the second functional layer and that is oriented back from the second thickening layer.

14. The electrode assembly according to claim 7, wherein the first electrode plates are positive electrode plates, and the second electrode plate is a negative electrode plate; and
   a width of the second active material layer is greater than a width of the first active material layer.

15. A battery cell, comprising:
   the electrode assembly according to claim 1; and
   a housing, configured to accommodate the electrode assembly.

16. A battery, comprising:
   the battery cell according to claim 15; and
   a box, configured to accommodate the battery cell.

17. An electrical device, comprising the battery according to claim 16.

18. A method for manufacturing an electrode assembly, wherein the manufacturing method comprises:
   providing first electrode plates and a second electrode plate;
   stacking the second electrode plate and two first electrode plates and then winding the electrode plates to form the electrode assembly, wherein
   the first electrode plates are of a polarity opposite to the second electrode plate, the second electrode plate is located between the two first electrode plates, each of the first electrode plates comprises a first composite current collector and a first active material layer, the first active material layer is disposed on a surface that is of the first composite current collector and that is oriented back from the second electrode plate, and the first composite current collector is configured to dielectrically isolate the first active material layer from the second electrode plate and allow passage of ions transmitted between the first active material layer and the second electrode plate.

19. A device for manufacturing an electrode assembly, wherein the manufacturing device comprises:

a providing apparatus, configured to provide first electrode plates and a second electrode plate; and an assembling apparatus, configured to stack the second electrode plate and two first electrode plates and then wind the electrode plates to form the electrode assembly, wherein the first electrode plates are of a polarity opposite to the second electrode plate, the second electrode plate is located between the two first electrode plates, each of the first electrode plates comprises a first composite current collector and a first active material layer, the first active material layer is disposed on a surface that is of the first composite current collector and that is oriented back from the second electrode plate, and the first composite current collector is configured to dielectrically isolate the first active material layer from the second electrode plate and allow passage of ions transmitted between the first active material layer and the second electrode plate.

* * * * *